US012283410B2

(12) United States Patent
Jiang

(10) Patent No.: US 12,283,410 B2
(45) Date of Patent: Apr. 22, 2025

(54) COMPACT OUTDOOR OPEN-CLOSE TYPE CURRENT TRANSFORMER

(71) Applicant: Jiangyin Spark Electronic Technology Co., Ltd., Wuxi (CN)

(72) Inventor: Dawei Jiang, Wuxi (CN)

(73) Assignee: Jiangyin Spark Electronic Technology Co., Ltd., Wuxi (CN)

( * ) Notice: Subject to any disclaimer, the term of this patent is extended or adjusted under 35 U.S.C. 154(b) by 791 days.

(21) Appl. No.: 17/431,164

(22) PCT Filed: Jul. 22, 2021

(86) PCT No.: PCT/CN2021/107741
§ 371 (c)(1),
(2) Date: Aug. 15, 2021

(87) PCT Pub. No.: WO2022/213513
PCT Pub. Date: Oct. 13, 2022

(65) Prior Publication Data
US 2023/0360835 A1 Nov. 9, 2023

(30) Foreign Application Priority Data
Apr. 6, 2021 (CN) ......................... 202110365954.2

(51) Int. Cl.
*H01F 27/02* (2006.01)
*H01F 27/28* (2006.01)
*H01F 27/29* (2006.01)
*H01F 27/32* (2006.01)

(52) U.S. Cl.
CPC ....... *H01F 27/022* (2013.01); *H01F 27/2828* (2013.01); *H01F 27/29* (2013.01); *H01F 27/321* (2013.01); *H01F 27/327* (2013.01)

(58) Field of Classification Search
CPC .... H01F 27/022; H01F 27/2828; H01F 27/29; H01F 27/321; H01F 27/327; H01F 2038/305; H01F 27/02; H01F 38/30; H01F 27/28; H01F 27/427; H01F 38/28
See application file for complete search history.

(56) References Cited

U.S. PATENT DOCUMENTS

2008/0012677 A1* 1/2008 Colsch ...................... H01F 3/14 336/178
2009/0115403 A1* 5/2009 Bernklau ................ H01F 38/30 336/176
(Continued)

FOREIGN PATENT DOCUMENTS

CN 204155745 U 2/2015
CN 105609299 A 5/2016
(Continued)

OTHER PUBLICATIONS

International Search Report, issued in PCT/CN2021/107741, dated Jan. 12, 2022.
(Continued)

*Primary Examiner* — Mang Tin Bik Lian
(74) *Attorney, Agent, or Firm* — Zhu Lehnhoff LLP

(57) ABSTRACT

The invention discloses a compact outdoor open-close type current transformer which comprises a transformer shell formed by butt joint of an upper half housing and a lower half housing, wherein an upper half hollow framework and a lower half hollow framework are arranged in the transformer shell, an upper half iron core is arranged in the upper half hollow framework, a lower half iron core is arranged in the lower half hollow framework, and a spring jacking piece is arranged between the upper half hollow framework and the upper half iron core; a winding wire is arranged on the lower half hollow framework, a framework baffle and a sealing gasket connected to the framework baffle are
(Continued)

arranged at the butt joint of the upper half hollow framework and the lower half hollow framework, and the framework baffle and the sealing gasket after being connected are respectively and correspondingly embedded in a guide positioning groove arranged in the upper half housing and the lower half housing; and inner spaces of the upper half housing and the lower half housing are filled with epoxy resin, a pair of lug hole plates, and a pressing plate and bolts for connecting the lug hole plates are arranged on the transformer shell. According to the invention, the fixing reliability between a cable and the transformer is improved, and screws can be prevented from falling off during high-altitude operation.

12 Claims, 8 Drawing Sheets

(56) References Cited

U.S. PATENT DOCUMENTS

| | | | | |
|---|---|---|---|---|
| 2012/0056702 | A1* | 3/2012 | Sebastian Balsalobre | H01F 38/34 336/96 |
| 2014/0176164 | A1* | 6/2014 | Davis | G01R 19/0084 324/709 |
| 2015/0054610 | A1* | 2/2015 | Cook | H01F 27/06 336/132 |
| 2019/0128927 | A1 | 5/2019 | Shaw et al. | |
| 2019/0180932 | A1* | 6/2019 | Han | H01F 38/30 |
| 2020/0176182 | A1* | 6/2020 | Thomas | H01F 41/06 |
| 2021/0011056 | A1* | 1/2021 | Weinstein | H01F 19/04 |

FOREIGN PATENT DOCUMENTS

| | | | |
|---|---|---|---|
| CN | 106373714 | * | 2/2017 |
| CN | 106373714 | A | 2/2017 |
| CN | 207302861 | U | 5/2018 |
| CN | 108172386 | * | 6/2018 |
| CN | 112489934 | A | 3/2021 |
| CN | 113053646 | A | 6/2021 |

OTHER PUBLICATIONS

Written Opinion, issued in PCT/CN2021/107741, dated Jan. 12, 2022.

* cited by examiner

COMPACT OUTDOOR OPEN-CLOSE TYPE CURRENT TRANSFORMER

TECHNICAL FIELD

The invention relates to the technical field of current transformers, in particular to a compact outdoor open-close type current transformer.

BACKGROUND ART

One of outdoor or waterproof open-close type current transformers on the market is characterized in that an iron core is wrapped with an insulating adhesive tape, the iron core is filled and sealed after being wound, and then cut; and a rubber pad is simply added in the middle. This outdoor open-close type current transformer has four defects. Firstly, the transformer has a large size and the product is heavy, and materials are seriously wasted, which does not facilitate the operation; secondly, due to the fact that the cutting is performed after the winding, filling and sealing done in advance, and the number of turns of a coil cannot be adjusted after the cutting, so that the accuracy of the transformer is poor; thirdly, due to the fact that the iron core is filled and sealed after being wound, the cold and thermal coefficients of the iron core and the epoxy are inconsistent in an area with great cold and thermal change, so that the consistency of the transformer can be greatly influenced; and fourthly, silica gel is simply added to the end face of the transformer for protection, without achieving a good protection effect.

A waterproof open-close type transformer is also on the market (for example, the invention patent has a title of waterproof transformer and assembly process thereof, and the patent number of ZL201610902056.5).

Both of these transformers have common disadvantages.

1. A cable is easy to loosen when being fixed.
2. During high-altitude operation, screws can easily fall off and the operation is inconvenient because the screws on the both sides are too small.
3. The compactness of the transformer is insufficient, and further improvement is needed.

SUMMARY OF THE INVENTION

In order to solve the problems above, the invention provides a compact outdoor open-close type current transformer for improving the fixing reliability between a cable and a transformer and preventing screws from falling off during high-altitude operation. The specific technical solution is as follows.

A compact outdoor open-close type current transformer comprises a transformer shell formed by connecting an upper half housing and a lower half housing which are semi-annular in a butt-joint mode, wherein an upper half hollow framework and a lower half hollow framework which are semi-annular are respectively arranged in the upper half housing and the lower half housing, a semi-annular upper half iron core is arranged in the upper half hollow framework, and a semi-annular lower half iron core is arranged in the lower half hollow framework; a winding wire is arranged on the outer contour of the lower half hollow framework, and a butt joint mouth part is respectively formed at a butt joint of the upper half housing and the lower half housing, a butt joint of the upper half hollow framework and the lower half hollow framework and a butt joint of the upper half iron core and the lower half iron core; and a compact winding structure for increasing the winding space is formed by arranging the mouth part of each butt-joint connection with the depth dimension of the mouth part larger than the width dimension of the mouth part.

According to one of the preferred ways of forming the compact winding structure for increasing the winding space, an annular oval shape is respectively formed after the butt-joint connection of the upper half housing and the lower half housing, after the butt-joint connection of the upper half hollow framework and the lower half hollow framework, and after the butt joint connection of the upper half iron core and the lower half iron core; and a long axis of the annular oval is positioned in the parallel direction of the butt-joint connection surface, and a short axis of the annular oval is positioned in the perpendicular direction of the butt-joint connection surface.

According to another preferred way of forming the compact winding structure for increasing the winding space, the upper half housing and the lower half housing are in butt joint to form a circular housing, the upper half hollow framework and the lower half hollow framework are in butt joint to form a circular hollow framework, the butt joint surface of the upper half housing and the lower half housing is eccentrically arranged towards the direction of the upper half housing, and the butt joint surface of the upper half hollow framework and the lower half hollow framework are eccentrically arranged towards the direction of the upper half hollow framework.

Preferably, a spring jacking piece is arranged between the inner side wall of the upper half hollow framework and the upper half iron core, a framework baffle and a sealing gasket connected with the framework baffle are respectively arranged at the butt joint of the upper half hollow framework and the lower half hollow framework, and the framework baffle and the sealing gasket after being connected are respectively and correspondingly embedded in the guide positioning groove arranged in the upper and lower half housings; and inner spaces of the upper half housing and the lower half housing are respectively filled with epoxy resin, the transformer shell is provided with a pair of lug hole plates used for fixing a primary side cable, and the primary side cable is fixed by the lug hole plates, and a pressing plate and bolts for connecting the lug hole plates.

Preferably, the upper half housing and the lower half housing are respectively and correspondingly provided with an upper fixing block and a lower fixing block which are butt-joint connected, and the upper fixing block and the lower fixing block are connected by special screws and anti-falling combined screw holes.

According to the invention, the special screws comprise a bolt head, a polished rod section and a threaded section which are sequentially connected, and the outer diameter of the polished rod section is less than the thread bottom diameter of the threaded section; the anti-falling combined screw hole comprises a section of internal thread hole formed on the upper fixing block, a section of bolt hole connected to the lower end of the internal thread hole, and an internal thread hole formed on the lower fixing block, wherein the size of the section of internal thread hole formed on the upper fixing block and the size of the internal thread hole formed on the lower fixing block are respectively matched with the size of the external thread of the thread section of the special screw; and the threaded section of the special screw rotates into a section of internal threaded hole formed on the upper fixing block and sequentially penetrates through the section of internal threaded hole and the bolt hole to be connected with the internal threaded hole formed on the lower fixing block.

According to the invention, the lower fixing block is provided with an inlay nut, and the inner threaded hole of the lower fixing block is provided on the inlay nut.

According to the invention, a waterproof terminal is inserted into the lower half housing, and a lead connected with a winding wire on the lower half hollow framework passes through the waterproof terminal.

According to the invention, the upper half housing and the lower half housing are respectively formed by connecting a shell seat and a shell cover.

Preferably, epoxy pouring holes are respectively formed in the upper half housing and the lower half housing, and the epoxy pouring holes are connected by buckles and are plugged with small sealing covers.

According to the invention, an arc-shaped positioning plate is provided on the transformer shell at a position between a pair of the lug hole plates.

According to the invention, the shell seat and the shell cover are connected by ultrasonic welding.

The invention has the following beneficial effects.

Firstly, the compact outdoor open-close type current transformer of the invention is characterized in that a pair of lug hole plates used for fixing the primary side cable are arranged on the transformer shell, and the cable is fixed by the lug hole plates, and the pressing plate and the bolts for connecting the lug hole plates, so that the fixing reliability between the cable and the transformer is improved.

Secondly, according to the compact outdoor open-close type current transformer, the connection between the upper half housing and the lower half housing adopts a special screw and a special connection structure, and the threaded section of the special screw is blocked by the upper internal thread on the upper fixing block before assembly, so that the screw can be effectively prevented from falling off during high-altitude operation.

Figure 1:
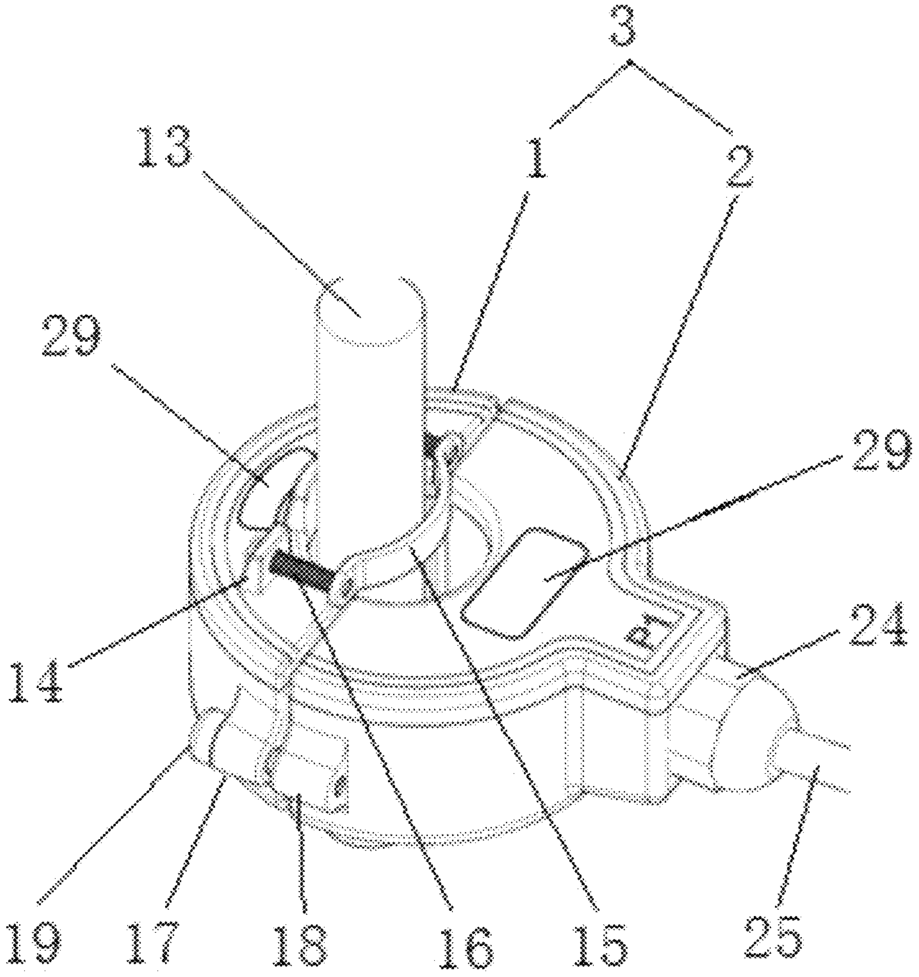
FIG. 1 is a schematic structural view of a compact outdoor open-close type current transformer of the present invention.
Figure 2:
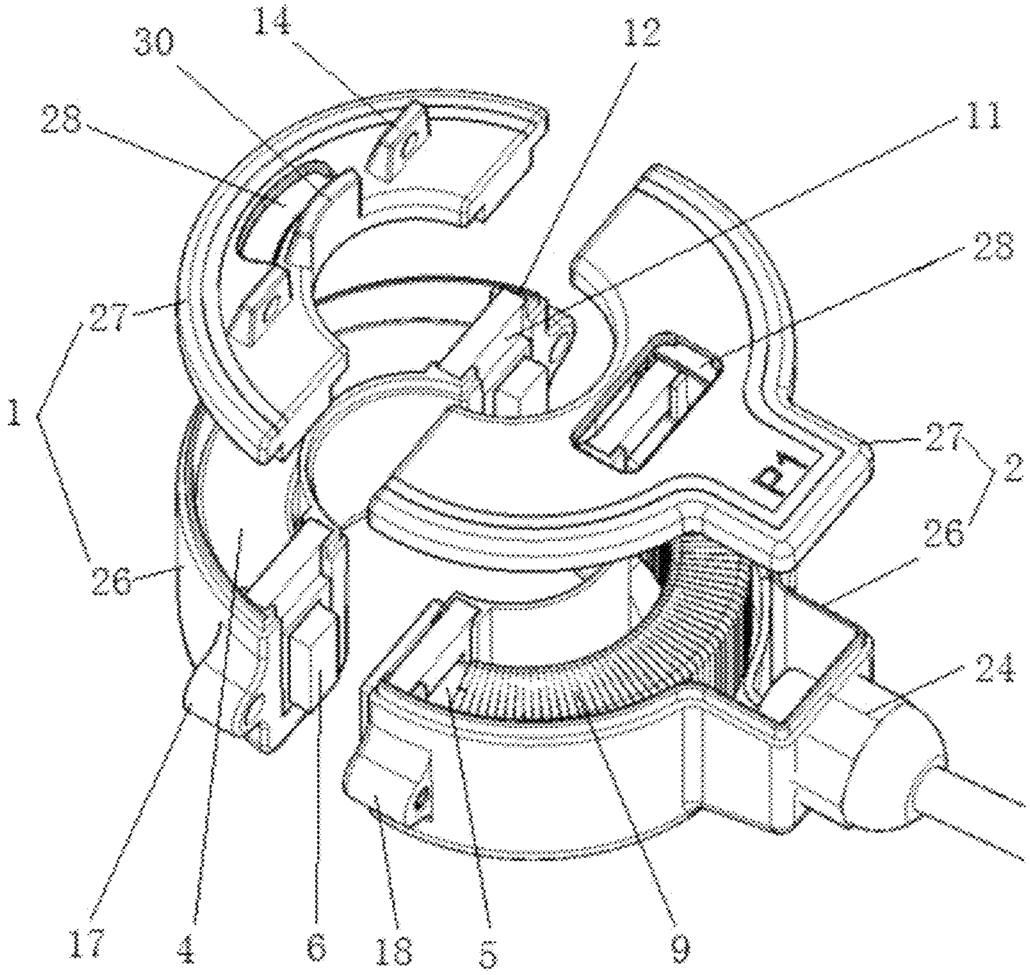
FIG. 2 is a schematic structural view of the compact outdoor open-close type current transformer of FIG. 1 with a shell cover disassembled.
Figure 3:
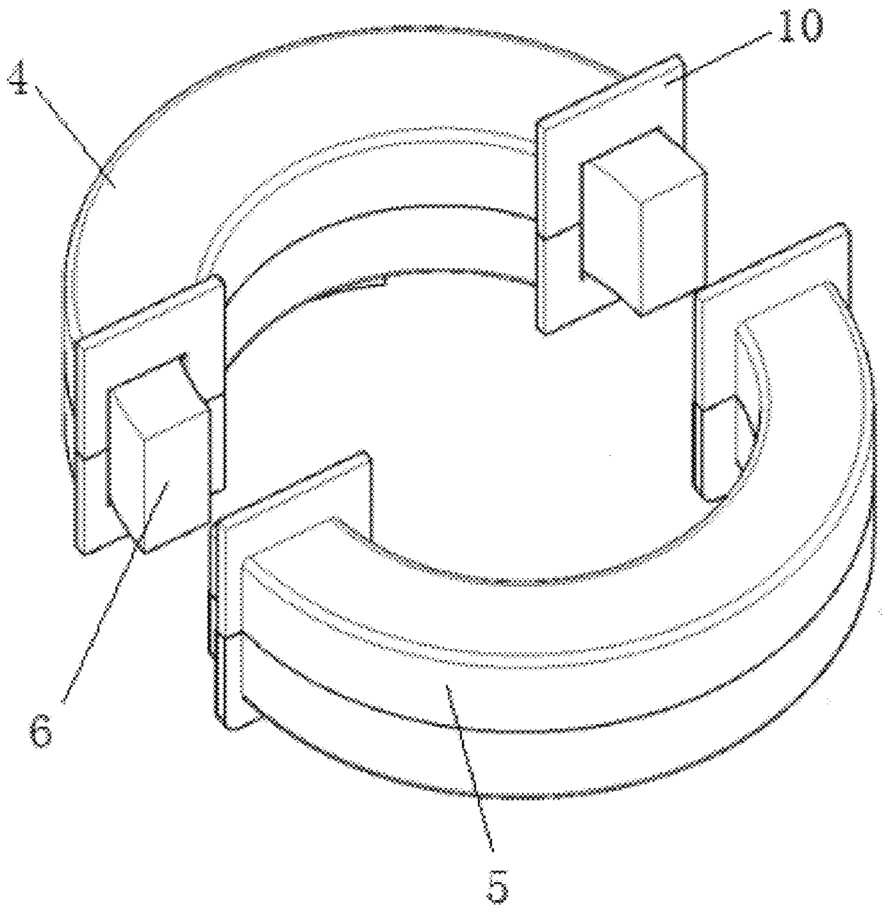
FIG. 3 is a schematic structural view in which an upper half iron core and a lower half iron core are provided in an upper half hollow framework and the lower half hollow framework of FIG. 2.
Figure 4:
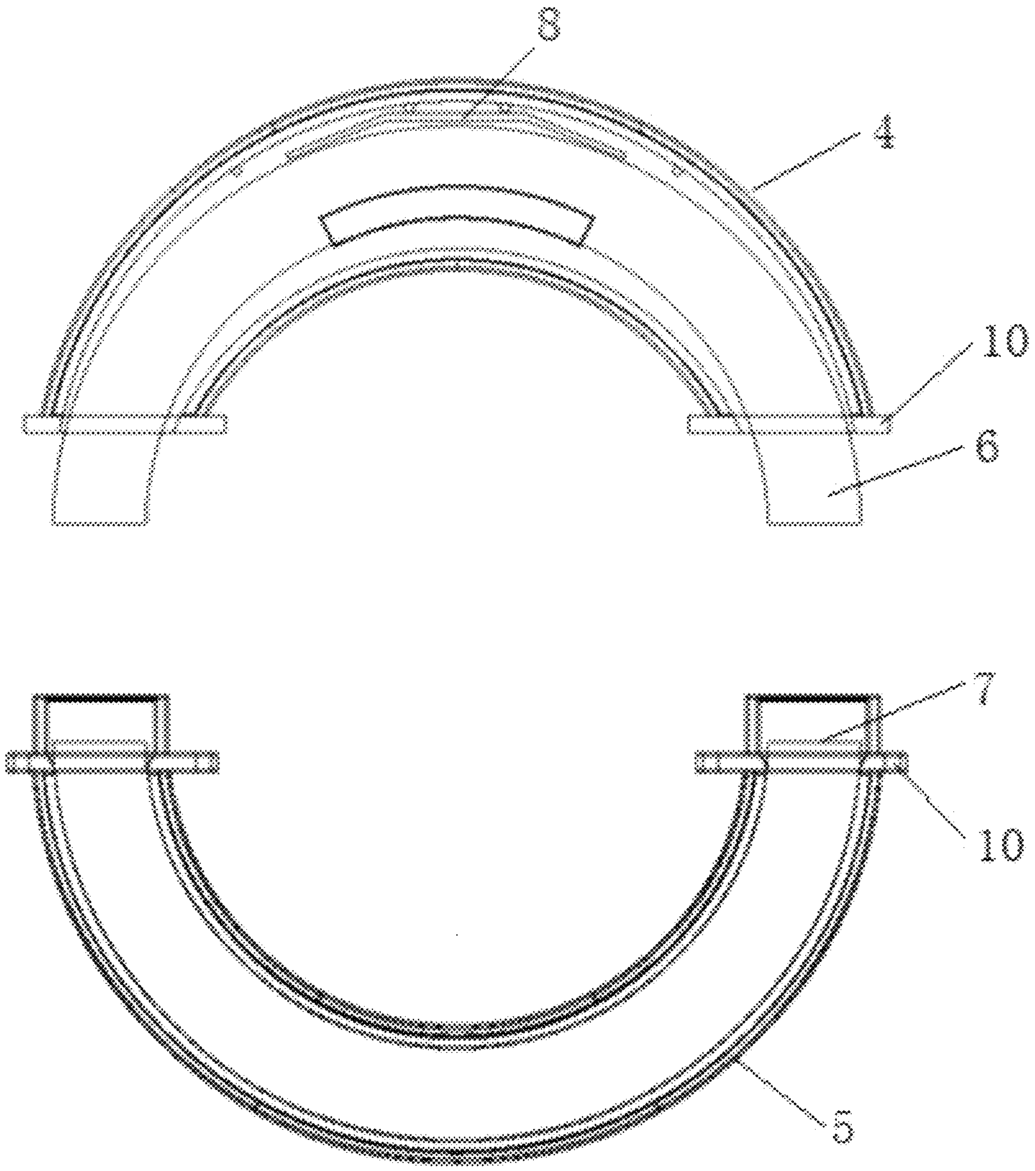
FIG. 4 is a top view of FIG. 3.
Figure 5:
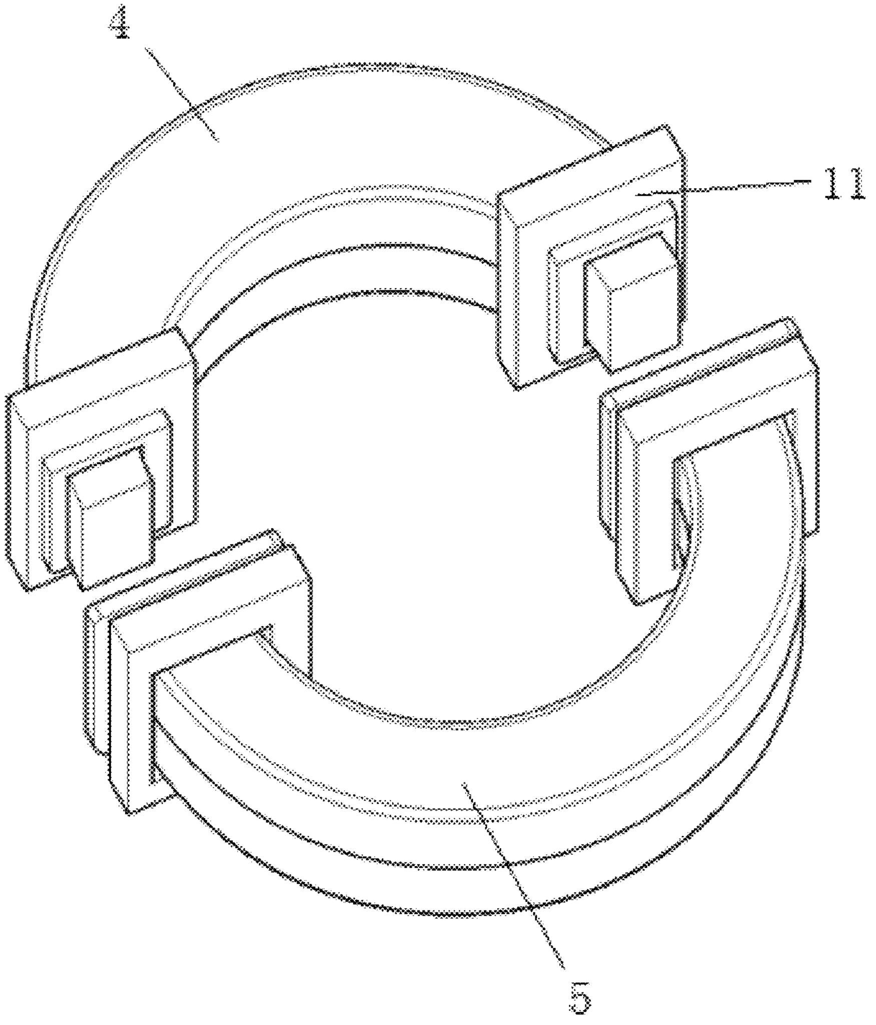
FIG. 5 is a schematic structural view after a sealing gasket is installed on the basis of FIG. 3.
Figure 6:
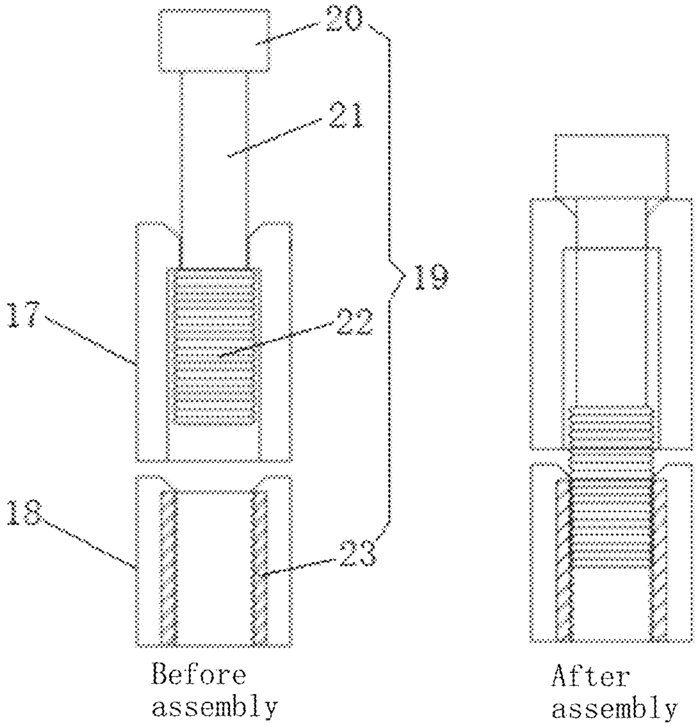
FIG. 6 is a schematic structural view in which an upper half housing and a lower half housing are connected by special screws.

In the drawings: 1, an upper half housing; 2, a lower half housing; 3, a transformer shell; 4, an upper half hollow framework; 5, a lower half hollow framework; 6, an upper half iron core; 7, a lower half iron core; 8, a spring jacking piece; 9, a winding wire; 10, a framework baffle; 11, a sealing gasket; 12, a guide positioning groove; 13, a primary side cable; 14, a lug hole plate; 15, a pressing plate; 16, a bolt; 17, an upper fixing block; 18, a lower fixing block; 19, a special screw; 20, a bolt head; 21, a polished rod section; 22, a threaded section; 23, an inlay nut; 24, a waterproof terminal; 25, a lead; 26, a shell seat; 27, a shell cover; 28, an epoxy pouring hole; 29, a small sealing cover; and 30, an arc-shaped positioning plate.

DETAILED DESCRIPTION OF THE INVENTION

The detailed description of the present invention are further described below in combination with the attached drawings and embodiments. The following embodiments are only intended to more clearly illustrate the technical solution of the present invention, and are not intended to limit the scope of the present invention.

Embodiment 1

As shown in FIGS. 1 to 11, the embodiment of the compact outdoor open-close type current transformer comprises a transformer shell 3 formed by connecting an upper half housing 1 and a lower half housing 2 which are semi-annular in a butt-joint mode, wherein the upper half hollow framework 4 and the lower half hollow framework 5 which are semi-annular are respectively arranged in the upper half housing 1 and the lower half housing 2, a semi-annular upper half iron core 6 is arranged in the upper half hollow framework 4, and a semi-annular lower part is arranged in the lower half hollow framework 5; a winding wire 9 is arranged on the outer contour of the lower half hollow framework 5, and a butt joint mouth part is respectively formed at a butt joint of the upper half housing 1 and the lower half housing 2, a butt joint of the upper half hollow framework 5 and the lower half hollow framework 5 and a butt joint of the upper half iron core 6 and the lower half iron core 7; and a compact winding structure for increasing the winding space is formed by arranging the mouth part of each butt-joint connection with the depth dimension of the mouth part larger than the width dimension of the mouth part.

According to one of the preferred ways of forming the compact winding structure for increasing the winding space, an annular oval shape is respectively formed after the butt-joint connection of the upper half housing 1 and the lower half housing 2, after the butt-joint connection of the upper half hollow framework 4 and the lower half hollow framework 5, and after the butt-joint connection of the upper half iron core 6 and the lower half iron core 7; and a long axis of the annular oval is positioned in the parallel direction of the butt-joint connection surface, and a short axis of the annular oval is positioned in the perpendicular direction of the butt-joint connection surface.

According to another preferred way of forming the compact winding structure for increasing the winding space, the upper half housing 1 and the lower half housing 2 are in butt joint to form a circular housing, the upper half hollow framework 4 and the lower half hollow framework 5 are in butt joint to form a circular hollow framework, the butt joint surface of the upper half housing 1 and the lower half housing 2 is eccentrically arranged towards the direction of the upper half housing 1, and the butt joint surface of the upper half hollow framework 4 and the lower half hollow framework 5 are eccentrically arranged towards the direction of the upper half hollow framework 4.

Preferably, a spring jacking piece 8 is arranged between the inner side wall of the upper half hollow framework 4 and the upper half iron core 6, a framework baffle 10 and a sealing gasket 11 connected with the framework baffle 10 are respectively arranged at the butt joint of the upper half hollow framework 4 and the lower half hollow framework 5, and the framework baffle 10 and the sealing gasket 11 after being connected are respectively and correspondingly embedded in the guide positioning groove 12 arranged on the upper and lower half housings 1 and 2; inner spaces of the upper half housing 1 and the lower half housing 2 are respectively filled with epoxy resin, the transformer shell 3 is provided with a pair of lug hole plates 14 used for fixing a primary side cable 13, and the primary side cable 13 is fixed by the lug hole plates 14, and a pressing plate 15 and bolts 16 for connecting the lug hole plates 14.

Preferably, the upper half housing 1 and the lower half housing 2 are respectively and correspondingly provided with an upper fixing block 17 and a lower fixing block 18 which are butt-joint connected, and the upper fixing block 17 and the lower fixing block 18 are connected by special screws 19 and anti-falling combined screw holes.

According to the embodiment, the special screws 19 comprise a bolt head 20, a polished rod section 21 and a threaded section 22 which are sequentially connected, and the outer diameter of the polished rod section 21 is less than the thread bottom diameter of the threaded section 22; the anti-falling combined screw hole comprises a section of internal thread hole formed on the upper fixing block 17, a section of bolt hole connected to the lower end of the internal thread hole, and an internal thread hole formed on the lower fixing block 18, wherein the size of the section of internal thread hole formed on the upper fixing block 17 and the size of the internal thread hole formed on the lower fixing block 18 are respectively matched with the size of the external thread of the thread section of the special screw 19; and the threaded section of the special screw 19 rotates into a section of internal threaded hole formed on the upper fixing block 17 and sequentially penetrates through the section of internal threaded hole and the bolt hole to be connected with the internal threaded hole formed on the lower fixing block 18.

According to the embodiment, the lower fixing block 18 is provided with an inlay nut 23, and the inner threaded hole of the lower fixing block 18 is provided on the inlay nut 23.

According to the embodiment, a waterproof terminal 24 is inserted into the lower half housing 2, and a lead 25 connected with a winding wire 9 on the lower half hollow framework 5 passes through the waterproof terminal 25.

According to the embodiment, the upper half housing 1 and the lower half housing 2 are respectively formed by connecting a shell seat 26 and a shell cover 27.

Preferably, epoxy pouring holes 28 are respectively formed on the upper half housing 1 and the lower half housing 2, and the epoxy pouring holes 28 are connected by buckles and are plugged with small sealing covers 29.

According to the embodiment, an arc-shaped positioning plate 30 is provided on the transformer shell 3 at a position between a pair of the lug hole plates 14.

According to the embodiment, the shell seat 26 and the shell cover 27 are connected by ultrasonic welding.

Embodiment 2

FIGS. 7 to 11 show two implementations of a compact winding structure for forming an increased winding space in a compact outdoor open-close type current transformer; in the figure, the left part is one of the preferred modes of the compact winding structure (forming an annular oval shape after the butt-joint connection), and the right part is another one of the preferred modes of the compact winding structure (forming an eccentric arrangement after the butt-joint connection).

For convenience, one of the preferred modes is simply referred to as an annular oval compact structure; and one of the preferred modes is simply referred to as a circular eccentric compact structure.

Figure 7:
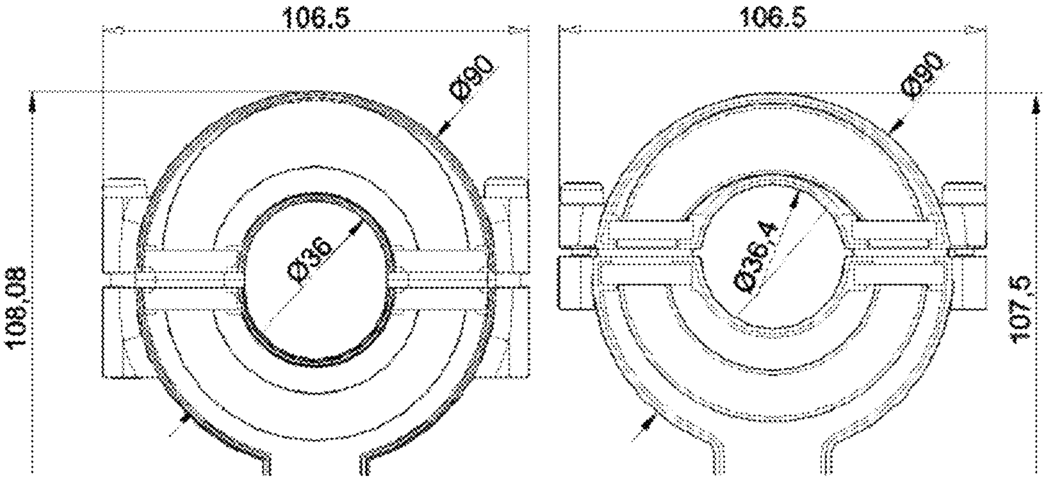
FIG. 7 is a schematic view illustrating an embodiment of a compact winding structure for forming an increased winding space in a compact outdoor open-close type current transformer; in the figure, the left part is one of the preferred modes of the compact winding structure (forming an annular oval shape after the butt joint connection), and the right part is another one of the preferred modes of the compact winding structure (forming an eccentric arrangement after the butt joint connection)

As shown in FIG. 7, the annular oval compact structure substantially conforms to the outer dimension of the circular eccentric compact structure.

The inner hole of the annular oval compact structure is an oval inner hole of φ 36 mm. The long axis direction of the oval is located in the direction perpendicular to the butt joint surface, and the requirement of compact design can be met. A certain winding space is increased compared with a conventional non-eccentric butt joint surface with a circular symmetric structure, and enameled wires with larger cross sections or more turns can be wound.

The annular oval compact structure described above can be further improved. Since the oval of the ring-shaped oval compact structure has a part of the space not fully utilized, and the diameter of the inner hole is just φ 36 mm, it is possible that the standard-sized cable of φ 36 mm will not easily penetrate through it in the later stage if slightly deformed.

According to a further improvement solution, a circular eccentric compact structure is adopted, the diameter of the inner hole of the circular eccentric compact structure is φ 36.4 mm, and the penetration of the standard-sized cable of φ 36 mm can be fully ensured.

Figure 8:
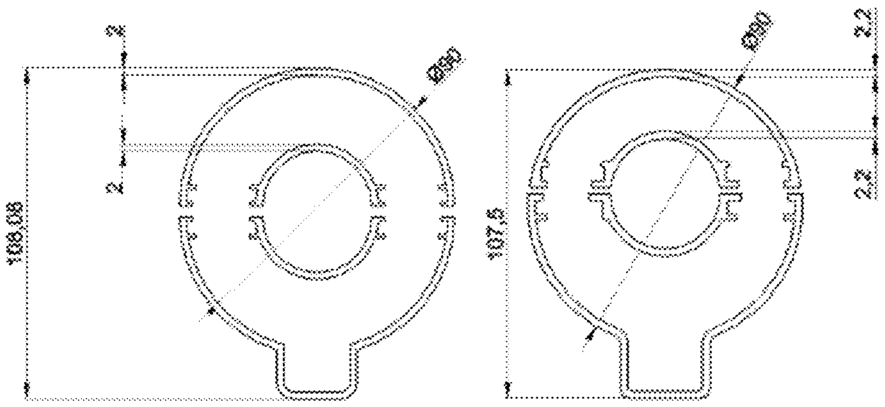
FIG. 8 is a schematic view of an embodiment of the upper and lower half housing of FIG. 7 corresponding to two compact winding configurations.
Figure 9:
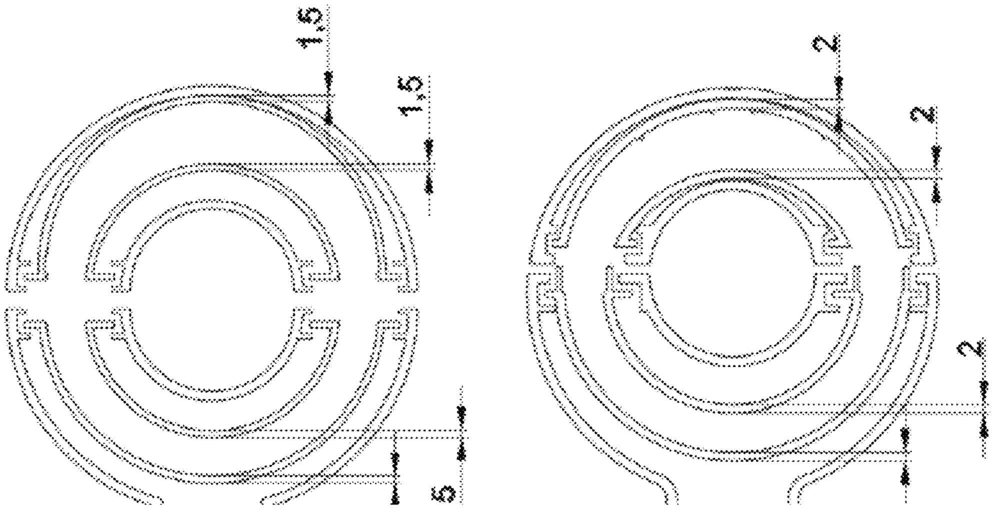
FIG. 9 is a schematic view of an embodiment of the upper and lower half hollow frameworks of FIG. 7 corresponding to two compact winding configurations.

As shown in FIGS. 8 to 9, compared with the annular oval compact structure of the same specification, the plastic wall thickness of the hollow framework of the circular eccentric compact structure is greater than that of the annular oval compact structure, the wall thickness of the housing is increased from 2 mm to 2.2 mm, and the wall thickness of the hollow framework is increased from 1.5 mm to 2 mm.

Figure 10:
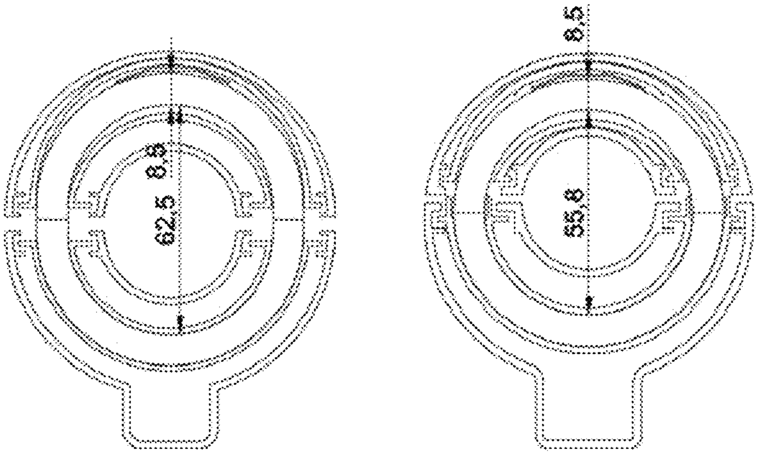
FIG. 10 is a schematic view of an embodiment after the upper and lower half hollow frameworks corresponding to the two compact winding structure modes are internally provided with the corresponding upper and lower half iron cores.

As shown in FIG. 10, the circular eccentric compact structure is better in transformer accuracy performance than the annular oval compact structure. Due to the accuracy performance of the transformer, on one hand, the internal resistance of the winding is reduced by virtue of the thicker enameled wire; on the other hand, the section of the iron core is required to be large enough, the length of a magnetic circuit of the transformer is small, and loss is reduced as much as possible so as to achieve higher performance. Here, we consider the iron core firstly, without thinking about the longitudinal dimension of the iron core, and consider the transverse dimension of both the annular oval compact structure and the circular eccentric compact structure, which are both 8.5 mm. The annular oval compact structure and the circular eccentric compact structure have the same iron core sections when the longitudinal dimension of the iron core is the same. However, the annular oval compact structure has a larger magnetic circuit length and more loss due to its annular oval core. The circular eccentric compact structure has circular oval iron core, and the magnetic path length is shorter. Therefore, with an overall consideration, the circular eccentric compact structure has better performance of the iron core, and the transformer has more excellent accuracy performance.

Figure 11:
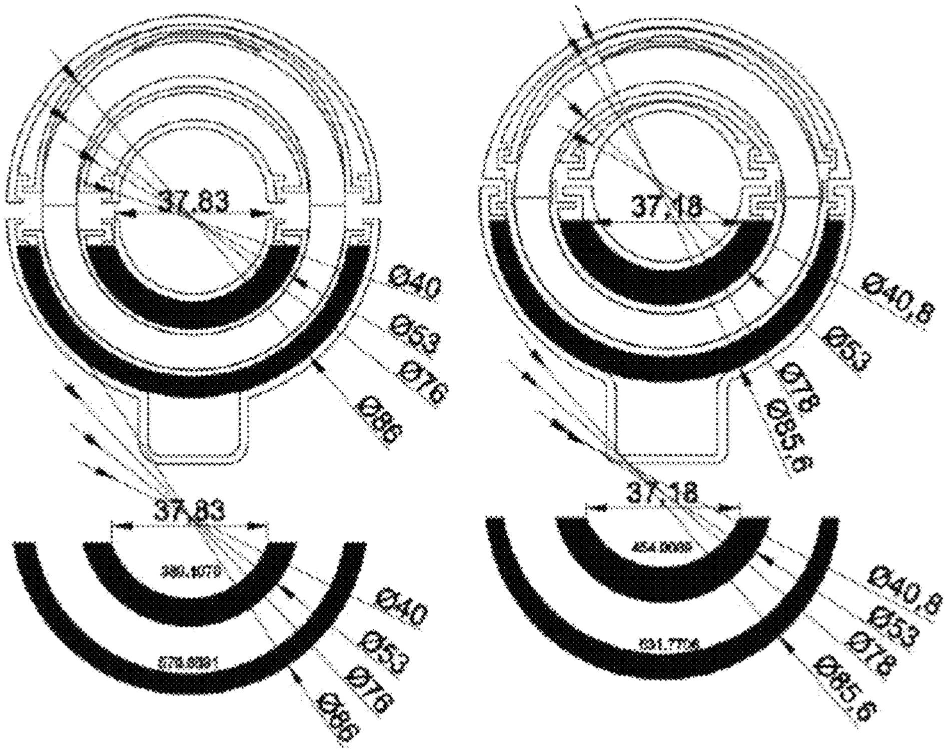
FIG. 11 is a schematic view for calculating the CAD area of the winding space (black body portion) corresponding to the two compact winding configurations in FIG. 10.

As shown in FIG. 11, the winding space area (the black body part is the sum of the black body areas of the upper part and the lower part) is selected in the CAD software, and the winding space areas of the annular oval compact structure and the circular eccentric compact structure are calculated by utilizing the area calculation function of the CAD software:

Winding space area of annular oval compact structure=upper black body area+upper black body area==389.1070+570.8891=959.9961 $mm^2$ Winding space area of circular eccentric compact structure=upper black body area+upper black body area=454.0089+631.7706=1085.7795 $mm^2$.

According to the above calculation, it can be further concluded that the winding space area of the circular eccentric compact structure is improved by about 13.1% compared with the winding space area of the annular oval compact structure. Therefore, it can be judged that the circular eccentric compact configuration is the first preferred configuration.

Of course, it is also possible to combine the above-mentioned two structures as desired.

The above mentioned are only preferred embodiments of the invention. It will be appreciated by those skilled in the art that some modifications and adaptations may be made without departing from the principle of the invention, and such modifications and alterations are intended to be included within the scope of the invention.

The invention claimed is:

1. A compact outdoor open-close type current transformer comprising:

a transformer shell including a semi-annular upper half housing and a semi-annular lower half housing opposing and secured to the upper half housing, each half housing including an arcuate inner wall and an arcuate outer wall, a first space between the inner wall and the outer wall of the upper half housing defining a first semi-annular space, and a second space between the inner wall and the outer wall of the lower half housing defining a second semi-annular space, the first and second semi-annular spaces together defining an annular space formed from an annular space having a circular outer periphery and a circular inner periphery, the inner periphery having a center which is eccentric with respect to a center of the outer periphery and is located inside the upper half housing;

a semi-annular upper half framework disposed in the semi-annular space of the upper half housing, and a semi-annular lower half framework disposed in the semi-annular space of the lower half housing and opposing the upper half framework;

a semi-annular upper iron core disposed in the upper framework and a semi-annular lower iron core disposed in the lower framework and opposing the upper iron core; and a winding wire wrapped around the lower framework.

2. A current transformer as claimed in claim 1 wherein the annular space comprises an oval annular space having a first axis and a second axis shorter than the first axis and extending perpendicular to the first axis.

3. A current transformer as claimed in claim 1 wherein the annular space has a circular outer periphery and a circular inner periphery, the inner periphery having a center which is eccentric with respect to a center of the outer periphery and located inside the upper half housing.

4. A current transformer as claimed in claim 1 including a spring jacking piece disposed inside the upper half framework between an inner peripheral surface of the upper half framework and the upper iron core.

5. A current transformer as claimed in claim 1 including a pair of lug hole plates mounted on one of the upper and lower half housings for securing a primary side cable, a pressing plate opposing the lug hole plates, and bolts connecting the pressing plate to the lug hole plates.

6. A current transformer as claimed in claim 1 including an epoxy resin which fills an interior of the upper and lower half housings around the upper and lower half frameworks.

7. A current transformer as claimed in claim 1 including a first fixing block mounted on an exterior of one of the upper and lower half housings, a second fixing block mounted on an exterior of the other of the upper and lower half housings opposing the first fixing block, and a screw which is rotatably mounted in a bore in the first fixing block and threadingly engaged with internal threads in the second fixing block.

8. A current transformer as claimed in claim 7 wherein:

the screw includes a bolt head, a rod section, and a threaded section having an outer diameter larger than an outer diameter of the rod section;

the bore in the first fixing block has a first portion which rotatably receives the rod section and a second portion which has an inner diameter larger than an inner diameter of the first portion and which houses the threaded section of the bolt;

the bolt head has outer dimensions larger than the inner diameter of the first portion of the bore; and the outer diameter of the threaded section of the screw has is larger than the inner diameter of the first portion of the bore, whereby the screw cannot fall out of the bore in the first fixing block.

9. A current transformer as claimed in claim 7 including an inlay nut disposed in the second fixing block and having internal threads, wherein the screw is screwed into the internal threads of the threaded insert.

10. A current transformer as claimed in claim 1 including a waterproof terminal which is inserted into the lower half housing, and a lead which is connected with the winding wire and passes through the waterproof terminal.

11. A current transformer as claimed in claim 1 wherein:

the upper half housing and the lower half housing each comprise a shell seat and a shell cover secured to the shell seat;

an epoxy pouring hole is formed in a top surface of the each of the shell covers; and each of the epoxy pouring holes is closed by a corresponding sealing cover.

12. A current transformer as claimed in claim 5 including an arc-shaped positioning plate provided on the transformer shell between the lug hole plates.

* * * * *